Figures 1, 2:
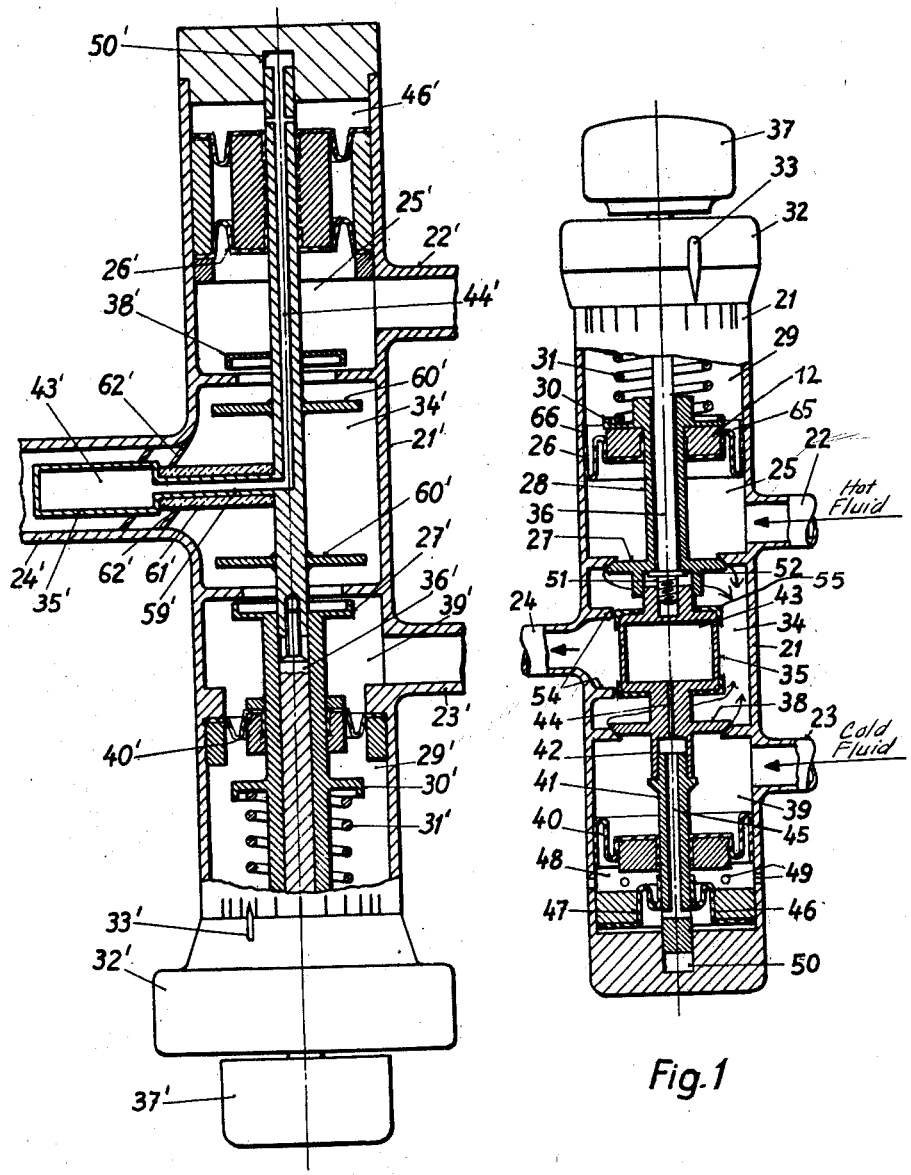

April 30, 1963 W. HONEGGER 3,087,675
MIXING VALVE WITH TEMPERATURE RESPONSIVE CONTROL
Filed April 17, 1957

INVENTOR.
WILLY HONEGGER

United States Patent Office 3,087,675
Patented Apr. 30, 1963

3,087,675
MIXING VALVE WITH TEMPERATURE
RESPONSIVE CONTROL
Willy Honegger, Zurich, Switzerland, assignor to
Albert Lins, Zurich, Switzerland
Filed Apr. 17, 1957, Ser. No. 653,470
16 Claims. (Cl. 236—12)

The present invention relates to mixing valves with controls having an adjustable control member which is actuated by an expansion medium.

Such controls are already known and often possess a solid body, such as a metallic or bimetallic body, forming the expansion medium as in a thermostat, by which a suitable heating or cooling device is started when the temperature exceeds or falls below a certain level. Controls having a liquid expansion medium are frequently employed, in particular for thermometric indicators and regulators. Such regulating devices have generally operated satisfactorily, but the variation of the expansion medium obtained per 1° C. change in temperature is relatively small, which necessitates the provision of a mechanically complicated design for many applications. Moreover, the thermal inertia of the expansion medium is substantial, which is often undesirable.

In contrast thereto the present invention relates to mixing valves with a temperature responsive control having a control member actuated by an expansion medium, in which the above disadvantages are largely eliminated. This control is characterized by a control chamber holding a vaporous expansion medium which fills the said chamber only partially, which medium remains in the wet vapour phase throughout a given temperature range, and by a line for pressure transmission through a suitable transmission medium for the actuation of the control member in dependence on the wet vapour pressure in the control chamber.

A number of embodiments of this invention will be described in greater detail in conjunction with FIGS. 1 and 2, in which:

FIG. 1 is a diagrammatic view of a mixing valve for hot and cold water incorporating the control according to this invention; and FIG. 2 is a different embodiment of such mixing valve.

The mixing valve according to FIG. 1 comprises the hollow valve body 21, a cold water supply line 23, a hot-water supply line 22 and a mixed-water delivery line 24.

Within the valve body 21 the hot-water or steam line 22 opens into the compartment or chamber 25 which is closed, on the one hand, by the diaphragm or seal 26 and, on the other, by valve disc 27. Valve disc 27 has a hollow shaft 28 extending through the hot-water chamber 25, it carries the liquid-tight diaphragm or seal 26 and passes into the spring chamber 29 beyond chamber 25, where it carries a disc 30 engaged by spring 31. The other end of spring 31 (not shown) rests on a threaded sleeve 32 slipped over the valve body 21 which can be screwed to the valve body 21 by rotation thus regulating, by axial displacement, the pressure exerted on the spring plate 30 by spring 31. A mark or indicator 33 on the threaded sleeve 32 and divisions provided on the valve body 21 enable the spring pressure upon disc 30 to be reproduceably adjusted.

Connected to the shaft 28 beneath spring plate 30 is a ring 12 designed to support and attach the seal 26. The seal in turn consists of a flexible sealing material or contains a sealing layer which must not, however, be elastic at the same time. The layer forms a bead or undulation that rolls when axial displacement takes place. This arrangement enables the shaft 28 to move in the longitudinal direction without encountering resistance and without friction, the two chambers 25 and 39 being sealed relatively to one another. The distance between two opposite bead points, e.g. the points 65 and 66, is approximately equal to the effective diameter of the valve disc 27. This is necessary in order that a change in pressure in chamber 25 cannot cause the shaft 28 to be displaced in the longitudinal direction. The effective working surfaces in both directions, i.e. in the upward and downward direction, are similar in size so that the forces produced by a pressure in the chamber cancel one another.

The hot-water chamber 25 opens into mixing chamber 34 via a valve that can be closed by means of valve disc 27. The mixing chamber 34 is connected with the delivery line 24. Arranged in the chamber 34 is a hollow body 35 which forms the control chamber for the expansion medium. The hollow body 35 is axially displaceable relative to the valve disc 27 by means of a rotating shaft or pin 36 which can be actuated by means of the knob 37 located outside the valve body or housing 21. When the knob 37 is actuated, the hollow body 35 is displaced in a guide attached to the valve disc 27. On the side remote from the valve disc 27, the mixing chamber 34 is closed by a second valve disc 38 rigidly attached to the hollow body 35; the said disc lifts off its seat together with the hollow body 35 on actuation of the rotating knob.

The valve disc 38 closes the mixing chamber 34 against a chamber 39 connected with the cold-water supply line 23. The opposite closure of the said chamber 39 is formed by a sealing member or diaphragm 40 arranged in air-tight relationship to a hollow sleeve 41 and to the inner wall of chamber 39 respectively, similar to the top seal 26. The hollow sleeve 41 passes through the chamber 39 and can move axially in a guide 42 provided for the valve disc 38 relative to the latter and to the valve body 21. The interior space 43 of the hollow body 35 communicates with passage 45 of sleeve 41 via a very narrow bore 44, said passage opening into a hollow space 46 via lateral bores.

The hollow space 46, which is formed, on the one hand, by the sealing member or diaphragm 47 attached to the sleeve 41 and, on the other, by the end face of the valve body 21, forms the control chamber and pressure transmitting system together with passage 45, bore 44 and the interior space 43. Arranged between the two sealing members 40, 47 attached to sleeve 41 is a chamber 48 which communicates with the atmosphere via bores 49 in the valve body 21. The sleeve 41 is held axially displaceable, besides the guide 42, by a bore 50 provided in the end face of the valve body 21.

Chamber 46, passage 45, bore 44 and part of the interior space 43 are filled with an expansion medium, such as Freon, so that a wet-vapour pressure according to the temperature in mixing chamber 34 is produced in the top portion of the interior space 43. Through the very narrow bore 44, which here forms a heat bridge, only very slight heat transmission occurs to passage 45 and chamber 46. Accordingly, the narrow bore 44 acts as a damping means which prevents the shaft 28 from oscillating during the flow of mixed water through the opening 24.

In the idle position illustrated, the supply to the mixing chamber 34 is closed by the two valves discs 27, 38, the rotating rotatable shaft or pin 36 forcing the valve disc 38 down against its seat via thread 51 on the one hand, and forcing down the valve disc 27 into its seat via collar 52. If the rotating knob 37 is actuated in the direction for opening, the thread 51 is screwed into the hollow body 35 and the shaft 28 follows the collar 52 under the action of spring 31 so that the valve disc 27 lifts off its seat, hot water flowing into mixing chamber 34 through line 22 and out through line 24. The quantity of water discharged can be adjusted by opening the valve between the chambers 25 and 34 to a greater or lesser degree with the rotating knob 37. As suitable design of the chambers 25 and 39 ensures that the pressure set up by the water from lines 22 and 23 is compensated relative to shaft 28 and sleeve 41 respectively, only the pressure of spring 31 is exerted on the valve disc 27 and shaft 28.

Shortly after opening the valve disc 27 the water flowing into the mixing chamber 34 will still be cold. As soon as hot water flows through the mixing chamber 34, the control chamber 43 begins to operate, wet-vapour pressure in the interior chamber 43 rises, is hydraulically transmitted to chamber 46, causes a rising pressure to be exerted upon diaphragm 47 and a counter-pressure against the action of spring 31, the said pressure being transmitted to the shaft 28 via sleeve 41 and guide 42. At a certain temperature in the mixing chamber 43 determined by the adjustment of spring 31, the wet-vapour pressure somewhat exceeds the pressure of spring 31 so that the hollow body 35 and the valve disc 38 are displaced in the direction towards the chamber 25 whereby the cold-water supply from chamber 39 is opened to mixing chamber 34 while the hot-water supply from chamber 25 is reduced. At a certain temperature of the mixed water, a condition of balance between the pressure of the spring 31 and the wet-vapour pressure in control chamber 43 is established in the temperature probe. Alteration of the spring pressure by means of threaded sleeve 32 will adjust the temperature at which the said condition of balance occurs, i.e. the temperature of the mixed water delivered through line 24 may be adjusted to the value desired; the temperature is then automatically created and maintained by the control device disclosed.

Where large differences of temperature prevail, it is recommended to provide means in the mixing valve described which ensure that the probe actually establishes contact with the mixed water only. In the mixing valve according to FIG. 1, these means comprise two substantially intermediate walls 54 which are arranged symmetrical to the mixed-water delivery line 24 at the level of the end faces of the cylindrical temperature probe 35. This ensures that the hot and cold water cannot flow directly to the outlet but first in the direction of the arrows towards the side opposite the delivery line 24. Here the water is largely mixed so that the circumferential surface of the temperature probe actually contacts water having the mixed-water temperature. Furthermore, the end faces of the probe 35 may be provided with insulation 55 so that the cold and hot water cannot act on the probe direct.

FIG. 2 shows a further embodiment of the mixing valve which deviates from that shown in FIG. 1 in several respects. Similar parts are designated by similar reference numerals with primes.

A mixing valve of the type disclosed is preferably designed so that the actuating knobs are placed at the right when the unit is arranged horizontally. As the hot-water line is most commonly arranged to the left of the cold-water line (when viewed from the valve), this cannot be achieved simply by a symmetrical interchange of the members of the mixing battery shown in FIG. 1. The mixing valve described below has been accordingly modified so that it is suitable for connection to normally arranged hot and cold-water lines while the actuating knobs are on the right.

The mixing valve according to FIG. 2 again consists of three compartments or chambers 23′, 24′, 39′ coaxially arranged, which chambers are separated by valves 38′ and 27′. The two outer chambers are again sealed by sealing members or diaphragms 26′, 40′. The closing direction of the valve discs 27′, 38′ is inward since the actuating knobs could not be arranged at the right-hand side of the valve otherwise.

For the combination of pressures, discs 60′ must be arranged on the axial valve guide to alter the course of the water flow. They cause the water flowing into the mixing chamber to transmit its energy to the discs 60′ so that the reaction on the valve discs is balanced, i.e. that the flow does not exercise a longitudinal force on the axis.

The temperature probe 35′ is here arranged at the outlet of the mixed water. This enables the probe actually to assume the temperature of the mixed water only so that control is effected only according to the actual mixed water temperature. Delivery outlet 24′ may be provided with baffle plates which cause the water flow to rotate for better temperature equalization. These baffle plates are indicated at 62′ in FIG. 2.

Arranged around the inlet 59 to the probe 35 is an insulating layer 61′ which is designed to prevent the unmixed water from affecting the probe.

The operation of the unit here described is similar to that according to FIG. 1. If the temperature of the hot water is increased at a certain mixed water temperature, the medium in the probe 35′ expands so that the pressure in chamber 46′ is increased. This will cause the spring 31′ to be further compressed and the valve disc 38′ is displaced slightly downwards in the embodiment of FIG. 4 so that the volume of the hot water supplied through line 22′ is reduced. As the expansion chamber 46′ is arranged behind the hot-water supply line in this embodiment, pressure is transmitted by a gaseous medium. The capillary tube 44′ again provides the heat bridge and it prevents liquid from entering the expansion space 46′.

The arrangements described enable space to be utilized satisfactorily on the one hand, and, contrary to systems already existing, all closing functions are performed, on the other hand, by only two valves. The alteration of the distance between the valve discs enables both valves to be closed so that no water is discharged on the one hand, and no water can flow from the hot-water supply line to the cold-water supply line and vice-versa on the other, in the event of different pressures appearing in the said two lines.

Having now particularly described and ascertained the nature of my said invention and in what manner the same is to be performed, I declare that what I claim is:

1. A mixing valve for mixing of at least two fluid mediums comprising a hollow valve body member, said valve body member including at least a first compartment, an intermediate compartment, and a second compartment, said respective compartments being coaxially arranged with respect to one another, first and second inlet ports for separate fluid mediums respectively communicating with said first and second compartments, said intermediate compartment having a delivery port for commingled fluid leading directly out therefrom through said valve body, valve means for controlling the flow of said separate fluid mediums from said first and second compartments into said intermediate compartment, respectively, temperature responsive means coacting with said valve means to displace the latter in dependence upon the temperature of said commingled fluid mediums, said temperature responsive means including (a) a hollow member located within said intermediate compartment and being partially filled with a vaporous expansion medium which remains in wet vapor phase throughout the temperature range of the fluid mediums, (b) a chamber defined in said hollow valve body and having expansible wall means operatively connected to said valve means, and (c) a line interconnecting said hollow member and said chamber and means cooperating with said valve means for balancing the effect of the pressure of said fluid mediums acting upon said valve means.

2. A mixing valve for mixing of at least two fluid mediums comprising, in combination, a hollow valve body member, said valve body member successively including at least a first compartment, an intermediate compartment, and a second compartment, said intermediate compartment being arranged between said first and second compartments and with said respective compartments being coaxially arranged with respect to one another, first and second inlet ports for separate fluid mediums respectively communicating with said first and second compartments, said intermediate compartment having a delivery port for commingled fluid leading directly out therefrom through said valve body, valve means for controlling the flow of said separate fluid mediums from said first and second compartments into said intermediate compartment, temperature responsive means positioned for contact by said commingled fluid mediums and including pressure transmitting means for displacing said valve means in dependency of the temperature of said commingled fluid mediums, said temperature responsive means including (a) a hollow member located within said intermediate compartment and being partially filled with a vaporous expansion medium which remains in wet vapor phase throughout the temperature range of the fluid mediums, (b) a chamber defined in said hollow valve body and having expansible wall means operatively connected to said valve means, and (c) a line interconnecting said hollow member and said chamber resilient means coacting with said valve means to exert a force opposing that of said pressure transmitting means, and means cooperating with said valve means for balancing the effect of the pressure of said fluid mediums acting upon said valve means.

3. A mixing valve according to claim 2; including means operable upon said resilient means for adjusting the force applying effect thereof.

4. A mixing valve according to claim 3; including means operatively connected with said valve means for adjusting the axial spacing therebetween.

5. A mixing valve according to claim 4; wherein said temperature responsive means are arranged in said intermediate chamber.

6. A mixing valve according to claim 5; wherein means are provided in said intermediate chamber to facilitate thorough mixing of said fluid mediums prior to contact with said temperature responsive means.

7. A mixing valve according to claim 6; wherein the surface of said temperature responsive means most readily contacted by non-commingled fluid mediums are provided with an insulating coating.

8. A mixing valve according to claim 4; wherein said temperature responsive means are arranged in said delivery port.

9. A mixing valve according to claim 8; wherein baffle plates are disposed to cooperate with said temperature responsive means so that said fluid mediums mix prior to contact therewith.

10. A mixing valve according to claim 2; including means interconnecting said valve means for conjoint movement, said valve means being positioned so that closing movement of one of said valve means causes opening movement of another of said valve means.

11. A mixing valve according to claim 10; wherein said temperature responsive means comprises a medium which remains in the wet-vapor state throughout the encountered temperature range.

12. A mixing valve according to claim 11; wherein said pressure balancing means include flexible diaphragm means arranged to delimit said first and second compartments and forming opposed end compartments, said flexible diaphragm means possessing an effective contact surface substantially equal to the contact surface of said valve means.

13. A mixing valve according to claim 12; wherein said resilient means is a spring member disposed in one of said opposed end compartments, said pressure transmitting means including means operably communicating the other of said opposed end compartments with said temperature responsive means.

14. A mixing valve according to claim 13; wherein one of said fluid mediums is hot water and another is cold water, said hot and cold water being admitted into said first and second compartments such that an increase in pressure in said other of said opposed end compartments carries out a closing movement of one of said valve means for said hot water and opening movement of another of said valve means for said cold water.

15. A mixing valve according to claim 13; wherein the surfaces of said temperature responsive means most readily contacted by non-commingled fluid mediums are provided with an insulating coating.

16. A mixing valve according to claim 12; where said flexible diaphragm means form a bead approximately defining the outer extremity of said effective contact surface.

References Cited in the file of this patent

UNITED STATES PATENTS

| | | |
|---|---|---|
| 1,300,717 | Fulton | Apr. 15, 1919 |
| 1,536,461 | Wadsworth | May 5, 1925 |
| 1,990,653 | Kollsman | Feb. 12, 1935 |
| 2,011,379 | Smith | Aug. 13, 1935 |
| 2,110,952 | Glenn | Mar. 15, 1938 |
| 2,369,242 | Lawler | Feb. 13, 1945 |
| 2,377,028 | Nicholas | May 29, 1945 |
| 2,584,417 | Branson | Feb. 5, 1952 |
| 2,821,343 | Payne | Jan. 28, 1958 |

FOREIGN PATENTS

| | | |
|---|---|---|
| 517,386 | France | Dec. 17, 1920 |
| 1,080,111 | France | Dec. 21, 1940 |
| 700,522 | Germany | Dec. 21, 1940 |